(12) United States Patent
Kobayashi et al.

(10) Patent No.: US 8,589,041 B2
(45) Date of Patent: Nov. 19, 2013

(54) CONTROL DEVICE AND CONTROL METHOD FOR VEHICLE

(75) Inventors: Nobufusa Kobayashi, Chiryu (JP); Tomohiro Asami, Nisshin (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 798 days.

(21) Appl. No.: 12/670,593

(22) PCT Filed: Jul. 28, 2008

(86) PCT No.: PCT/JP2008/063926
§ 371 (c)(1),
(2), (4) Date: Jan. 25, 2010

(87) PCT Pub. No.: WO2009/020083
PCT Pub. Date: Feb. 12, 2009

(65) Prior Publication Data
US 2010/0191430 A1  Jul. 29, 2010

(30) Foreign Application Priority Data
Aug. 7, 2007 (JP) ................................. 2007-205730

(51) Int. Cl.
*F16H 61/06* (2006.01)
(52) U.S. Cl.
USPC ........................................................... 701/60

(58) Field of Classification Search
USPC ........................................................... 701/60
See application file for complete search history.

(56) References Cited

FOREIGN PATENT DOCUMENTS

| | | | |
|---|---|---|---|
| JP | 05-263902 | A | 10/1993 |
| JP | 8-291858 | A | 11/1996 |
| JP | 9-229176 | A | 9/1997 |
| JP | 2002-089683 | A | 3/2002 |
| JP | 2004-100780 | A | 4/2004 |
| JP | 2004-125075 | A | 4/2004 |
| JP | 2004-125106 | A | 4/2004 |
| JP | 2006-329217 | A | 12/2006 |
| JP | 2007-162856 | A | 6/2007 |

OTHER PUBLICATIONS

Japanese Office Action dated Jun. 5, 2012 for corresponding Japanese Application No. 2007-205730.
Japanese Office Action dated Sep. 27, 2011 for corresponding Japanese Application No. 2007-205730.

*Primary Examiner* — Helal A Algahaim
*Assistant Examiner* — Kyung Kim
(74) *Attorney, Agent, or Firm* — Sughrue Mion, PLLC (57) ABSTRACT

An ECU executes a program that includes: a step of outputting a shift stage after a power-on down shift; a step of, when a turbine rotation speed NT does not increase to a synchronized rotation speed corresponding to the shift stage after the shift after an accelerator is deactivated, executing sweep control; and a step of, in a state that the shift stage after the shift is not formed, when the accelerator is activated, executing sweep control.

10 Claims, 7 Drawing Sheets

|      | C1 | C2 | C3 | C4 | B1 | B2 | F |
|------|----|----|----|----|----|----|---|
| P    | ×  | ×  | ×  | ×  | ×  | ×  | × |
| R1   | ×  | ×  | ○  | ×  | ×  | ○  | × |
| R2   | ×  | ×  | ×  | ○  | ×  | ○  | × |
| N    | ×  | ×  | ×  | ×  | ×  | ×  | × |
| 1ST  | ○  | ×  | ×  | ×  | ×  | ◎  | △ |
| 2ND  | ○  | ×  | ×  | ×  | ○  | ×  | × |
| 3RD  | ○  | ×  | ○  | ×  | ×  | ×  | × |
| 4TH  | ○  | ×  | ×  | ○  | ×  | ×  | × |
| 5TH  | ○  | ○  | ×  | ×  | ×  | ×  | × |
| 6TH  | ×  | ○  | ×  | ○  | ×  | ×  | × |
| 7TH  | ×  | ○  | ○  | ×  | ×  | ×  | × |
| 8TH  | ×  | ○  | ×  | ×  | ○  | ×  | × |

○ ENGAGED
× DISENGAGED
◎ ENGAGED IN CASE OF USE OF ENGINE BRAKE
△ ENGAGED WHEN ONLY BEING DRIVEN

CONTROL DEVICE AND CONTROL METHOD FOR VEHICLE

TECHNICAL FIELD

The present invention relates to a control device for a vehicle equipped with an automatic transmission. In particular, the present invention relates to control of an automatic transmission that suppresses a shortage of an engaging hydraulic pressure for a frictional engagement element on an engagement side in a case where an accelerator is subjected to an OFF operation and an ON operation after a power-on down shift.

BACKGROUND ART

Conventionally, there has been well known an automatic transmission that forms a desired shift stage by a combination of engagement states of frictional engagement elements such as a clutch and a brake. In this automatic transmission, a shift is performed in accordance with a degree of pressing down the accelerator (a foot pressing amount of an accelerator pedal) or a vehicle speed. For example, in a case where a degree of pressing down the accelerator increases abruptly during running of a vehicle, a down shift (referred to as a power-on down shift in the following description) or the like is performed.

When an accelerator is subjected to an OFF operation after commencement of the power-on down shift, a torque to be inputted from an engine decreases. Consequently, a difference between a turbine rotation speed and a synchronized rotation speed after the shift does not narrow, resulting in a plateau of the shift. In order to increase the turbine rotation speed of the automatic transmission to the synchronized rotation speed, sweep control is executed for increasing an engaging pressure for a frictional engagement element on an engagement side at a predetermined rate of change. The sweep control allows gentle engagement of the frictional engagement element on the engagement side, leading to suppression of a shock and progress of the shift.

As such shift control, for example, Japanese Patent Laying-Open No. 2004-125075 discloses a shift control method of an automatic transmission, which realizes a shockless shift by resolving following delay of a hydraulic pressure for an engagement element on an engagement side in a case where a power-off down shift is performed after commencement of a power-on down shift. In this shift control method, when a command of the power-off down shift is issued, an initial pressure is supplied to an engagement element. Further, at a time point when an input rotation speed becomes higher than an input rotation speed at a high shift stage by a predetermined value, a hydraulic pressure for the engagement element is feedback controlled such that the input rotation speed increases at a target rate of change. This control method includes a step of detecting a fact that a command of a power-off down shift is issued after commencement of a power-on down shift, a step of maintaining a certain pressure in the vicinity of an initial pressure for an engagement element irrespective of a change of an input rotation speed only during a predetermined period of time from the time point at which the command of the power-off down shift is detected, and a step of feedback controlling a hydraulic pressure for the engagement element such that the input rotation speed increases at a target rate of change after a lapse of the predetermined period of time.

According to the shift control method disclosed in the publication described above, it is possible to resolve following delay of a hydraulic pressure for an engagement element on an engagement side and to realize a shockless shift.

However, if a driver performs the ON operation on the accelerator again while the sweep control is executed, the torque inputted from the engine to the automatic transmission increases. Consequently, there is a problem that the turbine rotation speed of the automatic transmission increases more than necessary unless the engaging pressure for the frictional engagement element on the engagement side increases sufficiently. If the turbine rotation speed increases more than necessary, there is a possibility that a shock is generated upon formation of the shift stage after the down shift. The publication described above has no consideration to such a problem.

DISCLOSURE OF THE INVENTION

An object of the present invention is to provide a control device and a control method for a vehicle that appropriately engages a frictional engagement element on an engagement side in accordance with an operation of an accelerator to smoothly progress a shift after commencement of a power-on down shift.

A control device for a vehicle according to one aspect of the present invention is a control device for a vehicle equipped with an automatic transmission that forms a shift stage after a down shift in such a manner that a first frictional engagement element in a disengaged state is engaged while a second frictional engagement element in an engaged state is disengaged by a hydraulic pressure supplied based on a command value outputted to a hydraulic circuit. The control device includes a detection unit that detects a physical amount related to a state of the automatic transmission, and a control unit that is connected to the detection unit. The control unit determines whether or not a condition indicating delay of the shift is established, based on the state of the automatic transmission, after increase of a degree of pressing down an accelerator causes start of formation of the shift stage after said down shift. When the condition is established, the control unit outputs a command value corresponding to the hydraulic pressure to be supplied to the first frictional engagement element such that the command value increases at a first rate of change which is determined in advance with a predetermined value being defined as an initial value. When the degree of pressing down the accelerator increases while the control unit outputs the command value such that the command value increases at the first rate of change, the control unit outputs a command value such that the command value increases at a second rate of change which is determined in advance and is different from the first rate of change.

According to the present invention, when the formation of the shift stage after the down shift began by the increase of the degree of pressing down the accelerator and, then, the condition indicating the delay of the shift (e.g., a condition that a turbine rotation speed does not increase to a synchronized rotation speed after a shift after an accelerator is deactivated) is established based on the state of the automatic transmission, the command value corresponding to the hydraulic pressure to be supplied to the first frictional engagement element is outputted such that the command value increases at the first rate of change which is determined in advance with the predetermined value being defined as the initial value. Thus, the shift plateaued due to the deactivation of the accelerator is progressed, so that the shift stage after the down shift can be formed. Moreover, if the degree of pressing down the accelerator increases while the command value is outputted such that the command value increases at the first rate of change, the command value is outputted such that the command value increases at the second rate of change which is different from the first rate of change. For example, when the second rate of change is set to be higher than the first rate of change, the engaging pressure for the first frictional engagement element increases promptly in comparison with the case where the command value is outputted at the first rate of change. Hence, even when a torque to be inputted from an engine to the automatic transmission increases by the increase of the degree of pressing down the accelerator, the engaging pressure for the frictional engagement element on the engagement side can prevent the turbine rotation speed of the automatic transmission from increasing more than necessary. Accordingly, the present invention can provide a control device and a control method for a vehicle that appropriately engages a frictional engagement element on an engagement side in accordance with an operation of an accelerator to smoothly progress a shift after commencement of a power-on down shift.

Preferably, the second rate of change is higher than the first rate of change.

According to the present invention, when the second rate of change is set to be higher than the first rate of change, the engaging pressure for the first frictional engagement element increases promptly in comparison with the case where the command value is outputted at the first rate of change. Hence, even when the torque to be inputted from the engine to the automatic transmission increases by the increase of the degree of pressing down the accelerator, the engaging pressure for the frictional engagement element on the engagement side can prevent the turbine rotation speed of the automatic transmission from increasing more than necessary.

More preferably, the control device for the vehicle further includes a degree detection unit that detects the degree of pressing down the accelerator. When the detected degree of pressing down the accelerator becomes a predetermined degree or more while the control unit outputs the command value such that the command value increases at the first rate of change, the control unit outputs the command value such that the command value increases at the second rate of change.

According to the present invention, the degree of pressing down the accelerator becomes the predetermined degree or more. Hence, even when the torque to be inputted from the engine to the automatic transmission increases, the engaging pressure for the frictional engagement element on the engagement side can prevent the turbine rotation speed of the automatic transmission from increasing more than necessary.

More preferably, the control unit determines whether or not the vehicle is in a driven state, and determines whether or not the shift stage after the down shift is formed until a predetermined time elapses from the time point at which the control unit determines that the vehicle is in the driven state.

According to the present invention, the determination whether or not the shift stage after the down shift is formed until the predetermined time elapses from the time point at which it is determined that the vehicle is in the driven state allows the determination whether or not the shift is delayed.

More preferably, the control unit determines whether or not the vehicle is in the driven state, based on at least any one of a vehicle speed and the degree of pressing down the accelerator.

According to the present invention, it is possible to determine whether or not the vehicle is in the driven state, based on at least any one of the vehicle speed and the degree of pressing down the accelerator, with good accuracy.

More preferably, the automatic transmission includes a fluid coupling coupled to an output shaft of an internal combustion engine, and a transmission mechanism coupled to the fluid coupling. The control device further includes a rotation speed detection unit that detects a rotation speed of an input shaft of the transmission mechanism. The control unit determines that the shift stage after the down shift is not formed unless an absolute value of a difference between the detected input shaft rotation speed and a rotation speed corresponding to the shift stage after the down shift decreases to a predetermined value or less.

According to the present invention, the shift stage after the shift is not formed unless the difference between the input shaft rotation speed and the synchronized rotation speed corresponding to the shift stage after the shift narrows. Therefore, it can be determined that the shift is delayed.

BEST MODE FOR CARRYING OUT THE INVENTION

With reference to the drawings, hereinafter, description will be given of an embodiment of the present invention. In the following description, identical components are denoted by identical reference symbols. Designations and functions thereof are also the same. Accordingly, detailed description thereof will not be given repeatedly.

Figure 1:
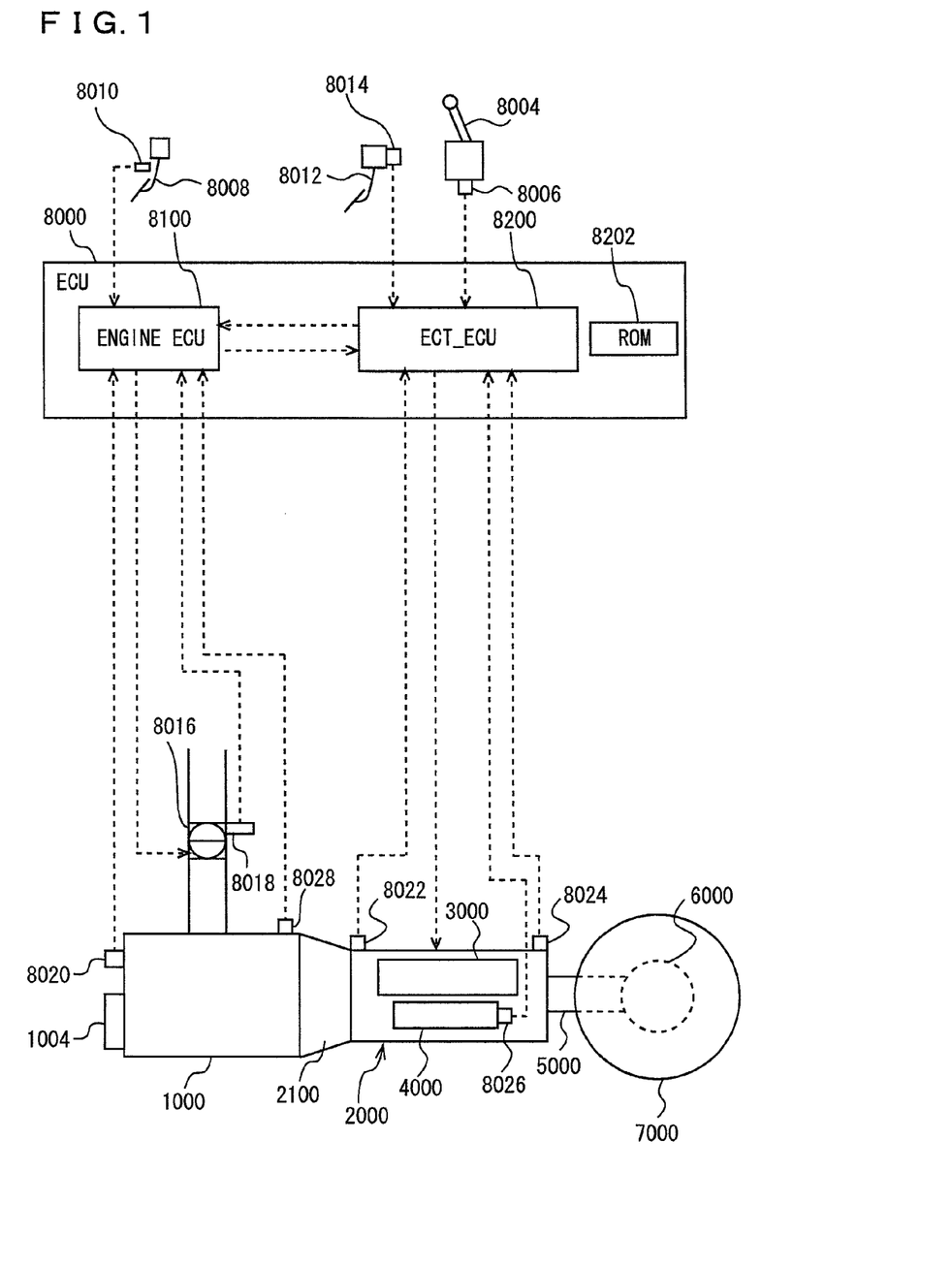
FIG. 1 shows a schematic configuration of a power train of a vehicle.

With reference to FIG. 1, description will be given of a vehicle equipped with a control device according to one embodiment of the present invention. This vehicle is an FR (Front engine Rear drive) vehicle. It is to be noted that this vehicle may be a vehicle other than such an FR vehicle.

The vehicle is equipped with an engine 1000, an automatic transmission 2000, a propeller shaft 5000, a differential gear 6000, rear wheels 7000, and an ECU (Electronic Control Unit) 8000. Automatic transmission 2000 includes a torque converter 2100, a transmission mechanism including a planetary gear unit 3000, and a hydraulic circuit 4000. The control device according to the present embodiment is realized by executing a program recorded in a ROM (Read Only Memory) 8202 of ECU 8000, for example.

Engine 1000 is an internal combustion engine that burns mixed gas of fuel injected from an injector (not shown) and air in a combustion room of a cylinder. A piston in the cylinder is pressed down by the combustion, so that a crank shaft is rotated. An auxiliary machine 1004 such as an alternator or an air conditioner is driven by a driving force of engine 1000. It is to be noted that a motor may be used as a mechanical power source in place of or in addition to engine 1000.

Torque converter 2100 has an input shaft coupled to an output shaft of engine 1000. Automatic transmission 2000 forms a desired shift stage to change a rotation speed of the crank shaft to a desired rotation speed.

A driving force outputted from automatic transmission 2000 is transmitted to left and right rear wheels 7000, respectively, via propeller shaft 5000 and differential gear 6000.

ECU 8000 is connected with a position switch 8006 of a shift lever 8004, an accelerator position sensor 8010 of an accelerator pedal 8008, a foot pressing force sensor 8014 of a brake pedal 8012, a throttle opening sensor 8018 of an electronic throttle valve 8016, an engine rotation speed sensor 8020, a turbine rotation speed sensor 8022, an output shaft rotation speed sensor 8024, an oil temperature sensor 8026, and a water temperature sensor 8028, through a harness and the like.

A position of shift lever 8004 is detected by position switch 8006, and a signal indicating a result of the detection is sent to ECU 8000. In correspondence with the position of shift lever 8004, the shift stage of automatic transmission 2000 is formed automatically. Moreover, a configuration may be such that a manual shift mode in which a driver can select an optional shift stage can be selected in accordance with an operation by the driver.

Accelerator position sensor 8010 detects a degree of pressing down the accelerator pedal 8008, and sends a signal indicating a result of the detection to ECU 8000. Foot pressing force sensor 8014 detects a foot pressing force of brake pedal 8012 (a force generated when the driver steps on brake pedal 8012), and sends a signal indicating a result of the detection to ECU 8000.

Throttle opening sensor 8018 detects an opening degree of electronic throttle valve 8016 of which the opening degree is regulated by an actuator, and sends a signal indicating a result of the detection to ECU 8000. A volume of air to be drawn into engine 1000 (an output of engine 1000) is regulated by electronic throttle valve 8016.

It is to be noted that the volume of air to be drawn into engine 1000 may be regulated by changing a lift amount of an intake valve (not shown) or an exhaust valve (not shown) or a phase to be opened/closed, in place of or in addition to electronic throttle valve 8016.

Engine rotation speed sensor 8020 detects a rotation speed of the output shaft (the crank shaft) of engine 1000, and sends a signal indicating a result of the detection to ECU 8000. Turbine rotation speed sensor 8022 detects a turbine rotation speed NT of torque converter 2100, and sends a signal indicating a result of the detection to ECU 8000. Output shaft rotation speed sensor 8024 detects an output shaft rotation speed NO of automatic transmission 2000, and sends a signal indicating a result of the detection to ECU 8000.

Oil temperature sensor 8026 detects a temperature (an oil temperature) of oil (ATF: Automatic Transmission Fluid) used for actuation or lubrication of automatic transmission 2000, and sends a signal indicating a result of the detection to ECU 8000.

Water temperature sensor 8028 detects a temperature (a water temperature) of cooling water for engine 1000, and sends a signal indicating a result of the detection to ECU 8000.

Based on the signals sent from position switch 8006, accelerator position sensor 8010, foot pressing force sensor 8014, throttle opening sensor 8018, engine rotation speed sensor 8020, turbine rotation speed sensor 8022, output shaft rotation speed sensor 8024, oil temperature sensor 8026, water temperature sensor 8028 and the like, a map and a program each stored in ROM 8202, ECU 8000 controls devices such that the vehicle is in a desired running state.

In the present embodiment, ECU 8000 controls automatic transmission 2000 such that one of forward first to eighth shift stages is formed in a case where a D (drive) range is selected as a shift range of automatic transmission 2000 because shift lever 8004 is in a D (drive) position. When one of the forward first to eighth shift stages is faulted, automatic transmission 2000 can transmit the driving force to rear wheels 7000. It is to be noted that a configuration may be such that a shift stage higher than the eighth shift stage can be formed in the D range. A shift stage to be formed is determined based on a shift diagram which is prepared in advance by an experiment and the like with a vehicle speed and a degree of pressing down the accelerator being defined as parameters.

As shown in FIG. 1, ECU 8000 includes an engine ECU 8100 that controls engine 1000, and an ECT (Electronic Controlled Transmission)_ECU 8200 that controls automatic transmission 2000.

Engine ECU 8100 and ECT_ECU 8200 are configured such that a signal can be exchanged therebetween. In the present embodiment, a signal indicating a degree of pressing down the accelerator is sent from engine ECU 8100 to ECT_ECU 8200. A signal indicating a torque required amount determined as a torque to be outputted from engine 1000 is sent from ECT_ECU 8200 to engine ECU 8100.

Figure 2:
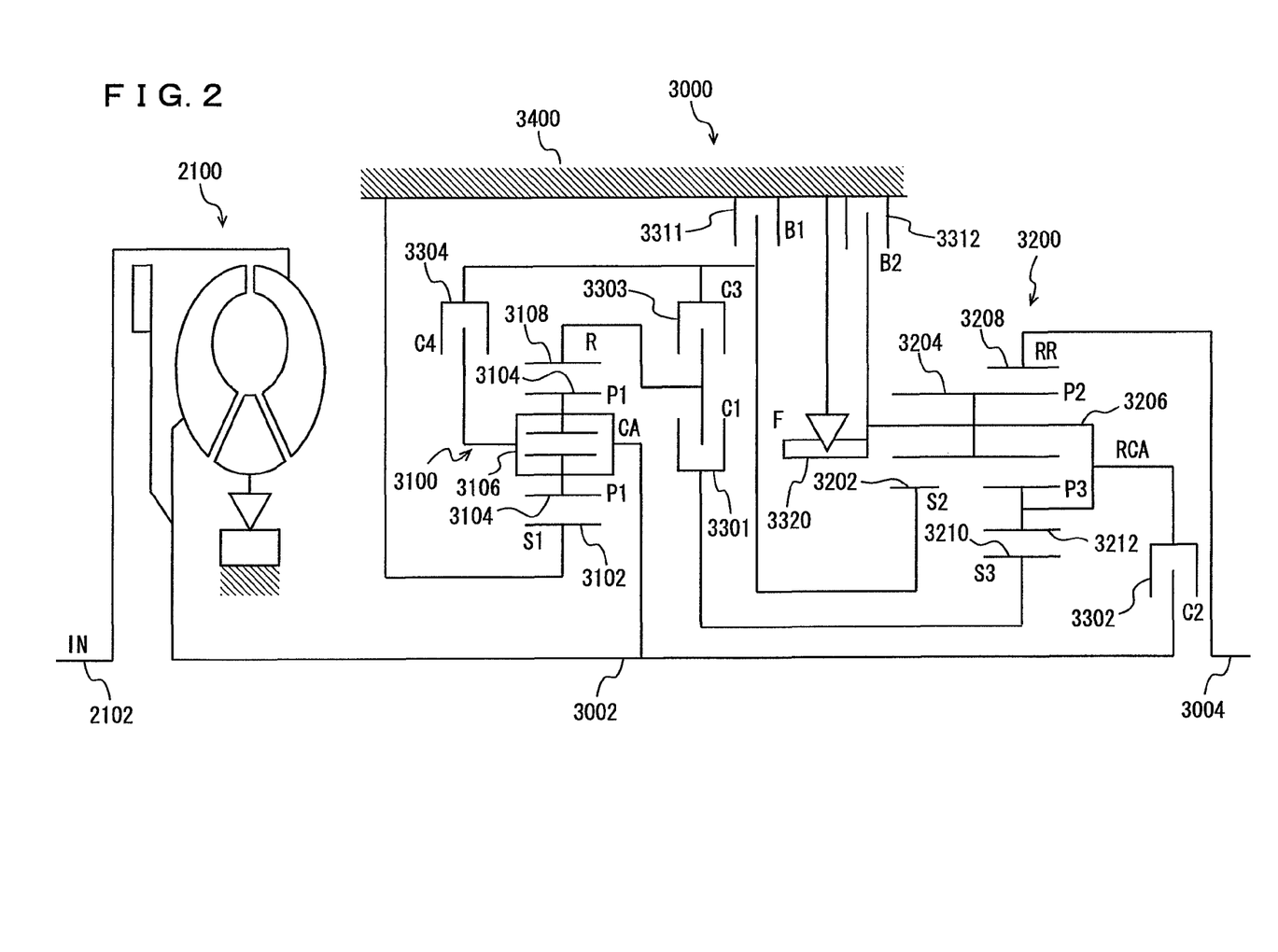
FIG. 2 shows a skeleton diagram of a planetary gear unit of an automatic transmission.

With reference to FIG. 2, description will be given of planetary gear unit 3000. Planetary gear unit 3000 is connected to torque converter 2100 having input shaft 2102 coupled to the crank shaft.

Planetary gear unit 3000 includes a front planetary 3100, a rear planetary 3200, a C1 clutch 3301, a C2 clutch 3302, a C3 clutch 3303, a C4 clutch 3304, a B1 brake 3311, a B2 brake 3312, and one-way clutch (F) 3320.

Front planetary 3100 is a planetary gear mechanism of a double pinion type. Front planetary 3100 includes a first sun gear (S1) 3102, a pair of first pinion gears (P1) 3104, a carrier (CA) 3106, and a ring gear (R) 3108.

First pinion gears (P1) 3104 are meshed with first sun gear (S1) 3102 and first ring gear (R) 3108, respectively. First carrier (CA) 3106 supports first pinion gear (P1) 3104 so as to allow revolution and rotation of first pinion gear (P1) 3104.

First sun gear (S1) 3102 is secured to a gear case 3400 such that first sun gear (S1) 3102 can not rotate. First carrier (CA) 3106 is coupled to an input shaft 3002 of planetary gear unit 3000.

Rear planetary 3200 is a planetary gear mechanism of a Ravigneaux type. Rear planetary 3200 includes a second sun gear (S2) 3202, a second pinion gear (P2) 3204, a rear carrier (RCA) 3206, a rear ring gear (RR) 3208, a third sun gear (S3) 3210, and a third pinion gear (P3) 3212.

Second pinion gear (P2) 3204 is meshed with second sun gear (S2) 3202, rear ring gear (RR) 3208 and third pinion gear (P3) 3212. Third pinion gear (P3) 3212 is meshed with third sun gear (S3) 3210 in addition to second pinion gear (P2) 3204.

Rear carrier (RCA) 3206 supports second pinion gear (P2) 3204 and third pinion gear (P3) 3212 so as to allow revolution and rotation of second pinion gear (P2) 3204 and third pinion gear (P3) 3212. Rear carrier (RCA) 3206 is coupled to one-way clutch (F) 3320. Rear carrier (RCA) 3206 can not rotate when the vehicle is driven at the first shift stage (when the vehicle is running through use of the driving force outputted from engine 1000). Rear ring gear (RR) 3208 is coupled to an output shaft 3004 of planetary gear unit 3000.

One-way clutch (F) 3320 is provided in parallel with B2 brake 3312. That is, one-way clutch (F) 3320 has an outer race secured to gear case 3400 and an inner race coupled to rear carrier (RCA) 3206.

Figure 3:
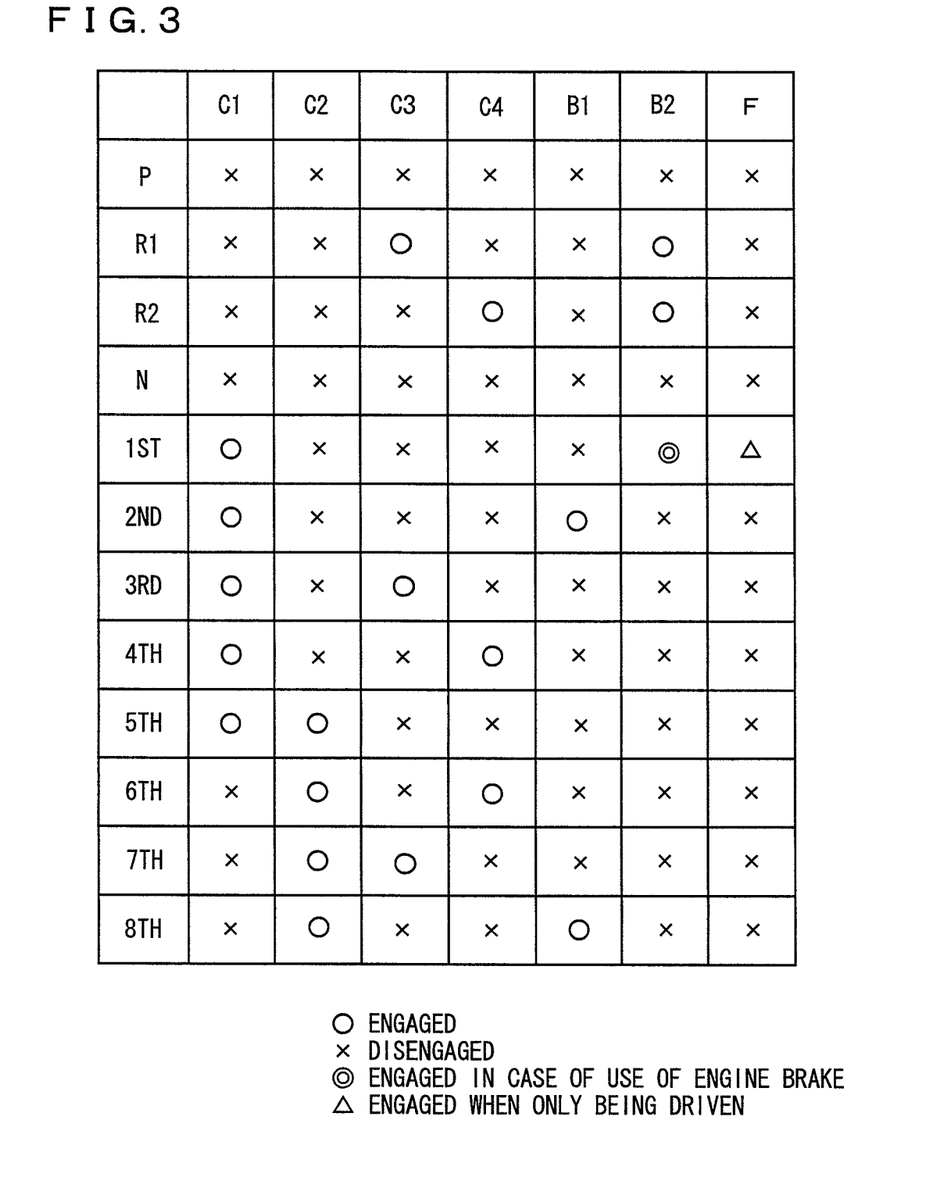
FIG. 3 shows an operation table of the automatic transmission.

FIG. 3 shows an operation table that represents a relation between the respective shift stages and operating states of the respective clutches and the respective brakes. When the respective brakes and the respective clutches are operated based on a combination shown in this operation table, the shift stages including the forward first to eighth shift stages and rearward first and second shift stages are formed.

Figure 4:
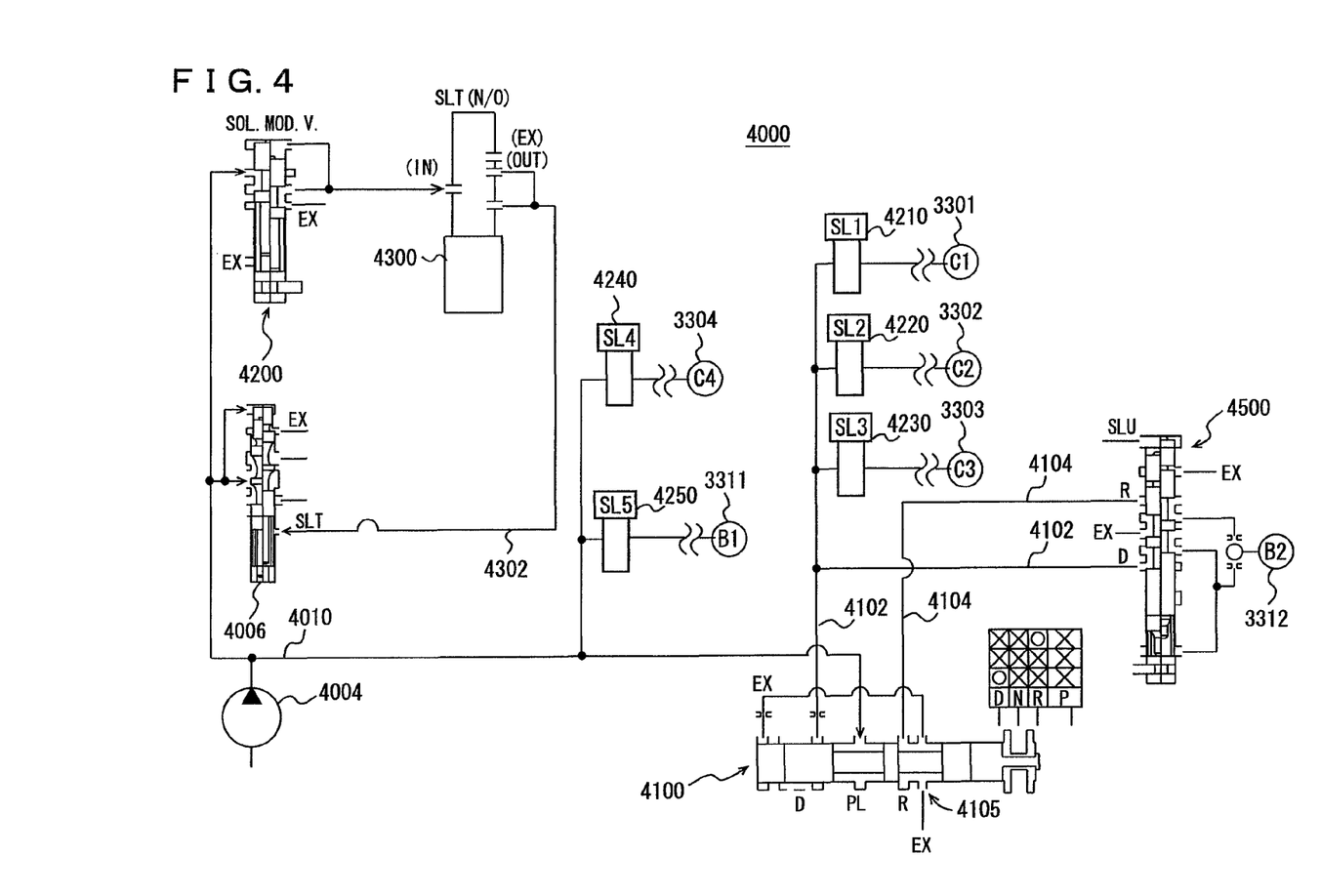
FIG. 4 shows a hydraulic circuit of the automatic transmission.

With reference to FIG. 4, description will be given of main parts of hydraulic circuit 4000. It is to be noted that hydraulic circuit 4000 is not limited to that to be described below.

Hydraulic circuit 4000 includes an oil pump 4004, a primary regulator valve 4006, a manual valve 4100, a solenoid modulator valve 4200, an SL1 linear solenoid (hereinafter, described as SL(1)) 4210, an SL2 linear solenoid (hereinafter, described as SL(2)) 4220, an SL3 linear solenoid (hereinafter, described as SL(3)) 4230, an SL4 linear solenoid (hereinafter, described as SL(4)) 4240, an SL5 linear solenoid (hereinafter, described as SL(5)) 4250, an SLT linear solenoid (hereinafter, described as SLT) 4300, and a B2 control valve 4500.

Oil pump 4004 is coupled to the crank shaft of engine 1000. When the crank shaft is rotated, oil pump 4004 is driven to generate a hydraulic pressure. The hydraulic pressure generated by oil pump 4004 is regulated by primary regulator valve 4006, so that a line pressure is generated.

Primary regulator valve 4006 is operated through use of, as a pilot pressure, a throttle pressure regulated by SLT 4300. The line pressure is supplied to manual valve 4100 through a line pressure oil path 4010.

Manual valve 4100 includes a drain port 4105. A hydraulic pressure on a D range pressure oil path 4102 and a hydraulic pressure on an R range pressure oil path 4104 are discharged from drain port 4105. In a case where a spool of manual valve 4100 is in a D position, line pressure oil path 4010 and D range pressure oil path 4102 are communicatively connected with each other, so that the hydraulic pressure is supplied to D range pressure oil path 4102. Herein, R range pressure oil path 4104 and drain port 4105 are communicatively connected with each other, so that the R range pressure on R range pressure oil path 4104 is discharged from drain port 4105.

In a case where the spool of manual valve 4100 is in an R position, line pressure oil path 4010 and R range pressure oil path 4104 are communicatively connected with each other, so that the hydraulic pressure is supplied to R range pressure oil path 4104. Herein, D range pressure oil path 4102 and drain port 4105 are communicatively connected with each other, so that the D range pressure on D range pressure oil path 4102 is discharged from drain port 4105.

In a case where the spool of manual valve 4100 is in an N position, both D range pressure oil path 4102 and R range pressure oil path 4104 and drain port 4105 are communicatively connected with each other, so that the D range pressure on D range pressure oil path 4102 and the R range pressure on R range pressure oil path 4104 are discharged from drain port 4105.

The hydraulic pressure supplied to D range pressure oil path 4102 is finally supplied to C1 clutch 3301, C2 clutch 3302 and C3 clutch 3303. The hydraulic pressure supplied to R range pressure oil path 4104 is finally supplied to B2 brake 3312.

Through use of, as an original pressure, the line pressure, solenoid modulator valve 4200 regulates a hydraulic pressure (a solenoid modulator pressure) to be supplied to SLT 4300 to a certain pressure.

SL(1) 4210 regulates the hydraulic pressure to be supplied to C1 clutch 3301. SL(2) 4220 regulates the hydraulic pressure to be supplied to C2 clutch 3302. SL(3) 4230 regulates the hydraulic pressure to be supplied to C3 clutch 3303. SL(4) 4240 regulates the hydraulic pressure to be supplied to C4 clutch 3304. SL(5) 4250 regulates the hydraulic pressure to be supplied to B1 brake 3311.

SLT 4300 regulates the solenoid modulator pressure and generates the throttle pressure in accordance with a control signal from ECU 8000 based on a degree of pressing down the accelerator detected by accelerator position sensor 8010. The throttle pressure is supplied to primary regulator valve 4006 through an SLT oil path 4302. The throttle pressure is used as the pilot pressure for primary regulator valve 4006.

SL(1) 4210, SL(2) 4220, SL(3) 4230, SL(4) 4240, SL(5) 4250 and SLT 4300 are controlled by control signals sent from ECU 8000.

B2 control valve 4500 selectively supplies the hydraulic pressure from any one of D range pressure oil path 4102 and R range pressure oil path 4104 to B2 brake 3312. D range pressure oil path 4102 and R range pressure oil path 4104 are connected to B2 control valve 4500. B2 control valve 4500 is controlled by a hydraulic pressure supplied from an SLU solenoid valve (not shown) and a bias force of a spring.

In a case where the SLU solenoid valve is activated, B2 control valve 4500 is in a state shown at a left side in FIG. 4. In this case, a hydraulic pressure obtained by regulating the D range pressure is supplied to B2 brake 3312 through use of, as the pilot pressure, the hydraulic pressure supplied from the SLU solenoid valve.

In a case where the SLU solenoid valve is deactivated, B2 control valve 4500 is in a state shown at a right side in FIG. 4. In this case, the R range pressure is supplied to B2 brake 3312.

In the vehicle equipped with automatic transmission 2000 described above, ECU 8000 determines whether or not a condition indicating delay of a shift is established, based on a state of automatic transmission 2000, after formation of a shift stage after a down shift began by increase of a degree of pressing down the accelerator. When the condition is established, ECU 8000 outputs a command value corresponding to a hydraulic pressure to be supplied to a frictional engagement element on an engagement side such that the command value increases at a rate of change (1) which is determined in advance with a predetermined value being defined as an initial value. If the degree of pressing down the accelerator increases while ECU 8000 outputs the command value such that the command value increases at the predetermined rate of change (1), ECU 8000 outputs a command value such that the command value increases at a rate of change (2) which is determined in advance and is different from the predetermined rate of change (1). The present invention has a feature in that ECU 8000 is operated as described above.

Specifically, ECU 8000 performs a power-on down shift when a position on a shift diagram, which is specified by a degree of pressing down the accelerator and a vehicle speed, traverses a down shift line by increase of the degree of pressing down the accelerator.

After beginning of the power-on down shift, ECU 8000 determines whether or not the vehicle is in a driven state. ECU 8000 determines whether or not the vehicle is in the driven state, based on at least any one of the vehicle speed and the degree of pressing down the accelerator.

Further, ECU 8000 determines whether or not a shift stage after the down shift is formed until a predetermined time elapses from the time point at which ECU 8000 determines that the vehicle is in the driven state. ECU 8000 determines that the shift stage after the down shift is not formed if a difference between turbine rotation speed NT and a synchronized rotation speed corresponding to the shift stage after the down shift does not narrow.

Further, if the shift stage after the down shift is not formed, ECU 8000 outputs a command value such that the command value increases at a rate of change (1) which is determined in advance with a predetermined value being defined as an initial value. Then, if the degree of pressing down the accelerator increases beyond a predetermined degree while ECU 8000 outputs the command value such that the command value increases at the predetermined rate of change (1), ECU 8000 outputs a command value such that the command value increases at a rate of change (2) which is determined in advance and is higher than the predetermined rate of change.

Figure 5:
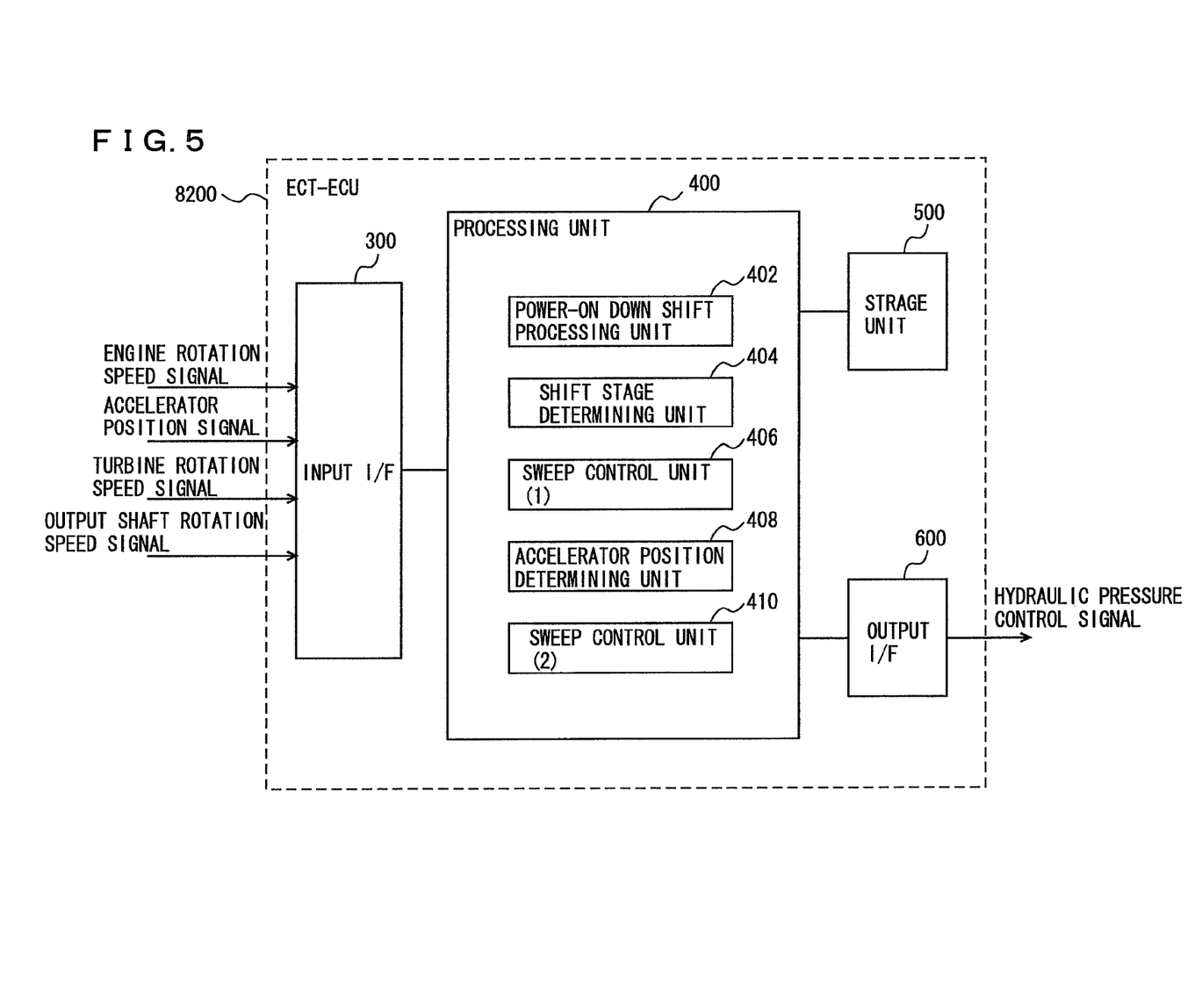
FIG. 5 shows a functional block diagram of an ECU which is a control device for the vehicle according to an embodiment of the present invention.

FIG. 5 shows a functional block diagram of ECU 8000 which is the control device for the vehicle according to the present embodiment. ECU 8000 includes an input interface (hereinafter, described as input I/F) 300, a processing unit 400, a storage unit 500, and an output interface (hereinafter, described as output I/F) 600.

Input I/F 300 receives an engine rotation speed signal from engine rotation speed sensor 8020, an accelerator position signal from accelerator position sensor 8010, a turbine rotation speed signal from turbine rotation speed sensor 8022 and an output shaft rotation speed signal from output shaft rotation speed sensor 8024, and then sends these signals to processing unit 400.

Processing unit 400 includes a power-on down shift processing unit 402, a shift stage determining unit 404, a sweep control unit (1) 406, an accelerator position determining unit 408, and a sweep control unit (2) 410.

Power-on down shift processing unit 402 executes a power-on down shift process based on a state of automatic transmission 2000. Specifically, when a position on a shift diagram based on a degree of pressing down the accelerator and a vehicle speed traverses a down shift line provided on the shift diagram in a case where the degree of pressing down the accelerator increases, power-on down shift processing unit 402 outputs a shift stage corresponding to the down shift line as a shift stage after a shift, and executes the power-on down shift process such that the vehicle runs at the shift stage after the shift. Power-on down shift processing unit 402 specifies the position on the shift diagram based on the degree of pressing down the accelerator and the vehicle speed, based on an accelerator position signal and an output shaft rotation speed signal. For example, the vehicle speed may be calculated from a product of an output shaft rotation speed and a speed reducing ratio from automatic transmission 2000 to the wheel or may be calculated based on a wheel speed detected by a wheel speed sensor (not shown).

Power-on down shift processing unit 402 executes disengagement control that lowers a hydraulic pressure to be supplied to a frictional engagement element on a disengagement side and, further, executes engagement control that raises a hydraulic pressure to be supplied to a frictional engagement element on an engagement side such that a frictional engagement element corresponding to the shift stage after the shift is in an engaged state.

When the vehicle is in a driven state after commencement of the power-on down shift, shift stage determining unit 404 determines whether or not a condition indicating delay of a shift is established until a predetermined time elapses from the time point at which the vehicle is in the driven state. In the present embodiment, the condition indicating the delay of the shift refers to a condition that turbine rotation speed NT does not increase to a synchronized rotation speed corresponding to a shift stage after a down shift until the predetermined time elapses from the time point at which the vehicle is in the driven state.

Shift stage determining unit 404 determines whether or not the vehicle is in the driven state, based on a fact the accelerator is deactivated in a state that the degree of pressing down the accelerator is lower than a predetermined degree A(0) after commencement of the power-on down shift. It is to be noted that shift stage determining unit 404 may determine whether or not the vehicle is in the driven state, based on the vehicle speed in addition to or in place of the degree of pressing down the accelerator. For example, shift stage determining unit 404 may determine that the vehicle is in the driven state when the vehicle speed shows a change corresponding to a decelerated state of the vehicle.

Further, when an absolute value of a difference between turbine rotation speed NT and the synchronized rotation speed corresponding to the shift stage after the down shift is not reduced to a predetermined value or less until a predetermined time elapses from the time point at which it is determined that the vehicle is in the driven state, shift stage determining unit 404 determines that turbine rotation speed NT does not increase to the synchronized rotation speed corresponding to the shift stage after the down shift, that is, determines that the condition indicating the delay of the shift is established.

When shift stage determining unit 404 determines that turbine rotation speed NT does not increase to the synchronized rotation speed corresponding to the shift stage after the down shift, sweep control unit (1) 406 outputs a command value via output I/F 600 such that the command value increases at a rate of change (1) which is determined in advance with the command value outputted currently being defined as an initial value. Hereinafter, the control for increasing the command value for the hydraulic pressure at the predetermined rate of change (1) will be referred to as sweep control (1). It is to be noted that, for example, sweep control unit (1) 406 may execute the sweep control (1) while setting a sweep control (1) execution flag.

Moreover, sweep control unit (1) 406 may output a command value such that the command value increases at a rate of change (1) which is determined in advance with a predetermined value being defined as an initial value.

While sweep control unit (1) 406 outputs the command value such that the command value increases at the predetermined rate of change (1), accelerator position determining unit 408 determines whether or not a degree of pressing down the accelerator received from input I/F 300 is predetermined opening A(0) or more. It is to be noted that, for example, accelerator position determining unit 408 may determine whether or not the degree of pressing down the accelerator is predetermined degree A(0) or more when the sweep control (1) execution flag is set. Moreover, accelerator position determining unit 408 may set an accelerator position determination flag when the degree of pressing down the accelerator is predetermined degree A(0) or more, for example.

When accelerator position determining unit 408 determines that the degree of pressing down the accelerator is predetermined degree A(0) or more, sweep control unit (2) 410 outputs a command value via output I/F 600 such that the command value increases at a rate of change (2) which is determined in advance with the current command value being defined as an initial value. Hereinafter, the control for increasing the command value for the hydraulic pressure at the predetermined rate of change (2) will be referred to as sweep control (2). It is to be noted that, for example, sweep control unit (2) 410 may execute the sweep control (2) when the accelerator position determination flag is set. It is to be noted in the present embodiment that "the predetermined rate of change (2)" is not particularly limited as long as it is higher than at least "the predetermined rate of change (1)" and has such a value that a rate of change of a hydraulic pressure to be supplied to a frictional engagement element on an engagement side becomes high, for example, a value adapted by an experiment and the like.

Moreover, sweep control unit (2) 406 may output a command value such that the command value increases at a rate of change (2) which is determined in advance with a predetermined value being defined as an initial value.

In the present embodiment, moreover, each of power-on down shift processing unit 402, shift stage determining unit 404, sweep control unit (1) 406, accelerator position determining unit 408 and sweep control unit (2) 410 is described as a part which functions as software realized in such a manner that a CPU corresponding to processing unit 400 executes a program stored in storage unit 500; however, such a part may be realized by hardware. It is to be noted that this program is installed on the vehicle while being recorded in a recording medium.

Storage unit 500 stores various kinds of information, programs, threshold values, maps and the like, and processing unit 400 reads/stores data from/in storage unit 500 if necessary.

Figure 6:
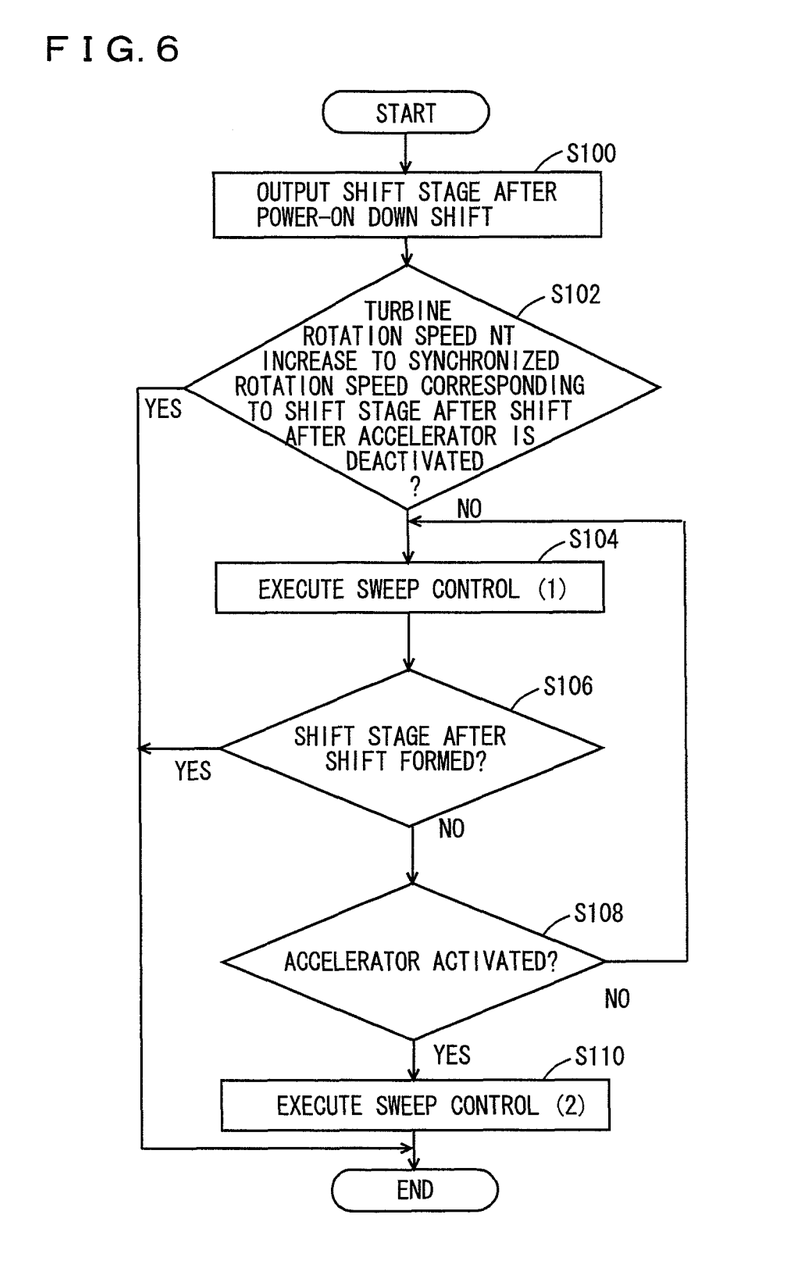
FIG. 6 shows a flow chart of a control structure of a program executed by the ECU which is the control device for the vehicle according to the present embodiment.

With reference to FIG. 6, hereinafter, description will be given of a control structure of the program executed by ECU 8000 which is the control device for the vehicle according to the present embodiment.

In step (hereinafter, the term, step, will be described as S) 100, when the position on the shift diagram based on the degree of pressing down the accelerator and the vehicle speed traverses the down shift line by the increase of the degree of pressing down the accelerator, ECU 8000 outputs the shift stage corresponding to the down shift line, and executes the power-on down shift.

In S102, ECU 8000 determines whether or not turbine rotation speed NT increases to the synchronized rotation speed corresponding to the shift stage after the down shift after the accelerator is deactivated. If turbine rotation speed NT increases to the synchronized rotation speed corresponding to the shift stage after the down shift (YES in S102), this process is completed. If not (NO in S102), this process proceeds to S104.

In S104, ECU 8000 executes the sweep control (1). In S106, ECU 8000 determines whether or not the shift stage after the shift is formed. For example, when the absolute value of the difference between turbine rotation speed NT and the synchronized rotation speed corresponding to the shift stage after the shift is the predetermined value or less, ECU 8000 determines that the shift stage after the shift is formed. If the shift stage after the shift is formed (YES in S106), this process is completed. If not (NO in S106), this process proceeds to S108.

In S108, ECU 8000 determines whether or not the accelerator is activated. That is, when the degree of pressing down the accelerator is the predetermined degree or more, ECU 8000 determines that the accelerator is activated. If the accelerator is activated (YES in S108), this process proceeds to S110. If not (NO in S108), this process returns to S104. In S110, ECU 8000 executes the sweep control (2).

Figure 7:
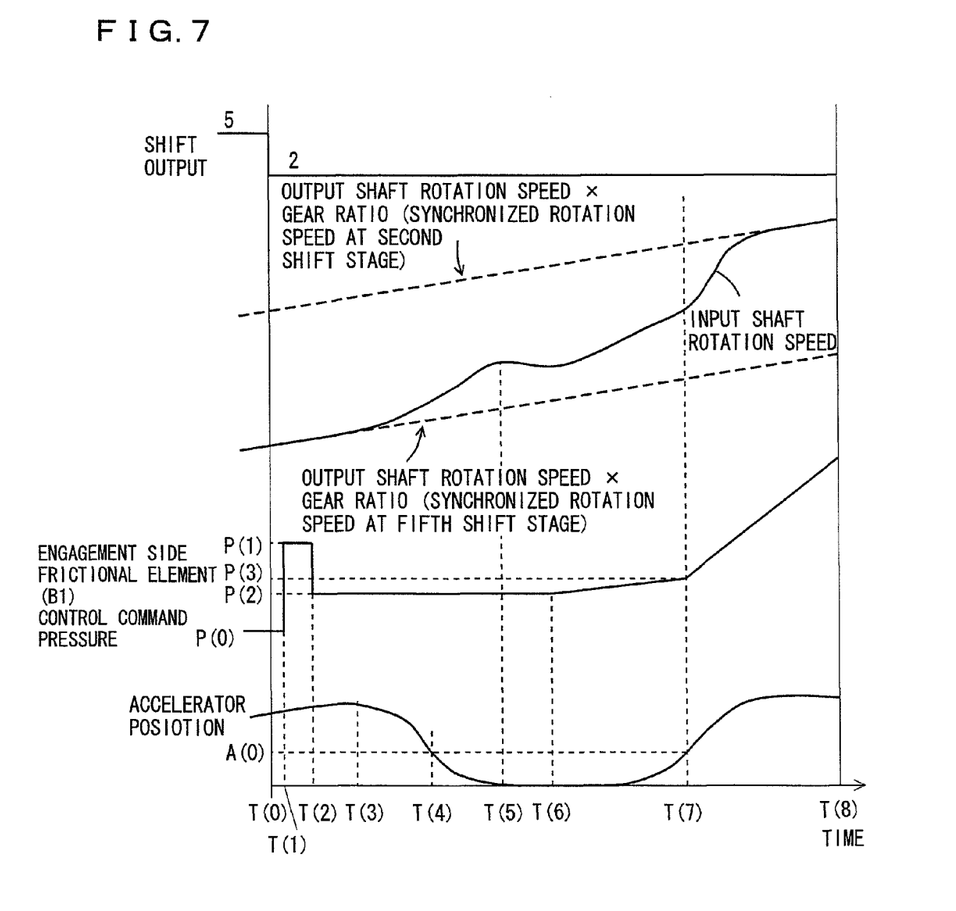
FIG. 7 shows a timing chart of operations of the ECU which is the control device for the vehicle according to the present embodiment.

With reference to FIG. 7, description will be given of the operations of ECU 8000 which is the control device for the vehicle according to the present embodiment, based on the structure and the flow chart each described above.

For example, it is assumed that the vehicle runs at a fifth shift stage. Herein, a shift output is the fifth shift stage. At a time T(0), when the driver steps on the accelerator pedal to increase the degree of pressing down the accelerator, the position on the shift diagram based on the degree of pressing down the accelerator and the vehicle speed traverses a down shift line from the fifth shift stage to a fourth shift stage, a down shift line from the fourth shift stage to a third shift stage, and a down shift line from the third shift stage to a second shift stage, so that the shift output becomes the second shift stage (S100). Therefore, a power-on down shift from the fifth shift stage which is the current shift stage to the second shift stage begins.

When the power-on down shift from the fifth shift stage to the second shift stage begins, the disengagement control is executed on C2 clutch 3302 and the engagement control is executed on B1 brake 3311. At a time T(1), therefore, a control command pressure for B1 brake 3311 (i.e., a command value for SL(5) 4250) increases in a stepwise manner from P(0) to a predetermined command pressure P(1). At a time T(2) after a lapse of a predetermined time, then, the control command pressure decreases in a stepwise manner to a predetermined command pressure P(2). Subsequent to time T(2), P(2) is outputted continuously.

Herein, an engaging pressure for C2 clutch 3302 lowers while an engaging pressure for B1 brake 3311 increases, so that turbine rotation speed NT starts to increase. Subsequent to a time T(3), the driver operates the accelerator pedal at the disengagement side. At a time T(4), when the degree of pressing down the accelerator is lower than predetermined degree A(0), it is determined that the accelerator is deactivated. When the accelerator is deactivated, the rotation speed of engine 1000 decreases. At a time T(5), therefore, turbine rotation speed NT starts to decrease conversely.

When turbine rotation speed NT decreases, the difference between turbine rotation speed NT and the synchronized rotation speed corresponding to the second shift stage which is the shift stage after the down shift enlarges. At a time T(6) after a lapse of a predetermined time from time T(4), if it is determined that turbine rotation speed NT does not increase to the synchronized rotation speed corresponding to the shift stage after the down shift (NO in S102), the sweep control (1) is executed (S104).

Therefore, the control command pressure increases at a rate of change (1) which is determined in advance with current command pressure P(2) being defined as an initial value. When the control command pressure increases at the predetermined rate of change (1) along with a lapse of a time, the engaging pressure for B1 brake 3311 increases, so that turbine rotation speed NT increases.

In a state that the shift stage after the shift is not formed (NO in S106), if the driver steps on the accelerator pedal again such that the degree of pressing down the accelerator becomes predetermined degree A(0) or more at a time T(7) (YES in S108), the sweep control (2) is executed (S110).

Therefore, the control command pressure increases at a rate of change (2) which is determined in advance with current command pressure P(3) being defined as an initial value. A degree of raise of the engaging pressure for B1 brake 3311 becomes larger in the case where the command value increases at the predetermined rate of change (2) in comparison with the case where the command value increases at the predetermined rate of change (1). Therefore, turbine rotation speed NT promptly approaches the synchronized rotation speed corresponding to the second shift stage.

At a time T(8), when turbine rotation speed NT substantially matches with the synchronized rotation speed corresponding to the shift stage after the down shift, that is, when the absolute value of the difference between turbine rotation speed NT and synchronized rotation speed at the second shift stage becomes the predetermined value or less, a maximum value is outputted as the control command pressure. Thus, B1 brake 3311 is engaged completely, so that the second shift stage is formed.

In the control device for the vehicle according to the present embodiment, as described above, when the formation of the shift stage after the down shift began by the increase of the degree of pressing down the accelerator and, then, the condition indicating the delay of the shift (e.g., the condition that the turbine rotation speed does not increase to the synchronized rotation speed after the shift after the accelerator is deactivated) is established based on the state of the automatic transmission, the command value corresponding to the hydraulic pressure to be supplied to the frictional engagement element on the engagement side is outputted such that the command value increases at the rate of change (1) which is determined in advance with the predetermined value being defined as the initial value. Thus, the shift plateaued due to the deactivation of the accelerator is progressed, so that the shift stage after the down shift can be formed.

Moreover, if the degree of pressing down the accelerator increases while the command value is outputted such that the command value increases at the predetermined rate of change (1), the command value is outputted such that the command value increases at the predetermined rate of change (2). The predetermined rate of change (2) is a value that increases the hydraulic value largely in comparison with the predetermined rate of change (1); therefore, the engaging pressure for the frictional engagement element on the engagement side increases promptly. Hence, even when the torque to be inputted from the engine to the automatic transmission increases by the increase of the degree of pressing down the accelerator, the engaging pressure for the frictional engagement element on the engagement side can prevent the turbine rotation speed of the automatic transmission from increasing more than necessary. Accordingly, it is possible to provide a control device and a control method for a vehicle that appropriately engages a frictional engagement element on an engagement side in accordance with an operation of an accelerator to smoothly progress a shift after commencement of a power-on down shift.

Further, the determination whether or not the shift stage after the down shift is formed until the predetermined time elapses from the time point at which it is determined that the vehicle is in the driven state, based on at least any one of the vehicle speed and the degree of pressing down the accelerator allows the determination whether or not the shift is delayed.

It should be understood that the embodiment disclosed herein is in all aspects illustrative and not restrictive. The scope of the present invention is defined by the appended claims rather than by the foregoing description, and all changes that fall within metes and bounds of the claims, or equivalence of such metes and bounds thereof are therefore intended to be embraced by the claims.

The invention claimed is:

1. A control device for a vehicle equipped with an automatic transmission that forms a shift stage after a down shift in such a manner that a first frictional engagement element in a disengaged state is engaged while a second frictional engagement element in an engaged state is disengaged by a hydraulic pressure supplied based on a command value outputted to a hydraulic circuit, said control device comprising:
a degree detection unit that detects a degree of pressing down an accelerator;
a rotation speed detection unit that detects a turbine rotation speed of said automatic transmission; and
a control unit that is connected to said degree detection unit and said rotation speed detection unit, wherein
said control unit determines whether or not a condition indicating delay of shift is established, based on said degree of pressing down an accelerator and said turbine rotation speed, after increase of a degree of pressing down an accelerator causes start of formation of the shift stage after said down shift,
when said condition is established, said control unit outputs a command value corresponding to the hydraulic pressure to be supplied to said first frictional engagement element such that the command value increases at a first rate of change which is determined in advance with a predetermined value being defined as an initial value,
when the degree of pressing down the accelerator increases while said control unit outputs the command value such that the command value increases at said first rate of change, said control unit outputs a command value such that the command value increases at a second rate of change which is determined in advance and is different from said first rate of change until an absolute value of a difference between the turbine rotation speed and a synchronized turbine rotation speed corresponding to the shift stage after said down shift decreases to a predetermined value or less, and
said second rate of change is higher than said first of change.

2. The control device for the vehicle according to claim 1, when said detected degree of pressing down the accelerator becomes a predetermined degree or more while said control unit outputs the command value such that the command value increases at said first rate of change, said control unit outputs the command value such that the command value increases at said second rate of change.

3. The control device for the vehicle according to any one of claims 1 and 2, wherein
said control unit determines whether or not said vehicle is in a driven state, and
said control unit determines whether or not the shift stage after the down shift is formed until a predetermined time elapses from a time point at which said control unit determines that said vehicle is in the driven state.

4. The control device for the vehicle according to claim 3, wherein
said control unit determines whether or not said vehicle is in the driven state, based on at least any one of a vehicle speed and the degree of pressing down the accelerator.

5. The control device for the vehicle according to claim 3, wherein
said automatic transmission includes a fluid coupling coupled to an output shaft of an internal combustion engine, and a transmission mechanism coupled to said fluid coupling,
said control device further comprising a rotation speed detection unit that detects a rotation speed of an input shaft of said transmission mechanism, wherein
said control unit determines that the shift stage after said down shift is not formed unless an absolute value of a difference between said detected input shaft rotation speed and a rotation speed corresponding to the shift stage after said down shift decreases to a predetermined value or less.

6. A control method for a vehicle equipped with an automatic transmission that forms a shift stage after a down shift in such a manner that a first frictional engagement element in a disengaged state is engaged while a second frictional engagement element in an engaged state is disengaged by a hydraulic pressure supplied based on a command value outputted to a hydraulic circuit, said control method comprising:

a step of detecting a degree of pressing down the accelerator;

a step of detecting a turbine rotation speed of said automatic transmission;

a determination step of determining whether or not a condition indicating delay of shift is established, based on said degree of pressing down the accelerator and said turbine rotation speed, after increase of a degree of pressing down an accelerator causes start of formation of the shift stage after said down shift;

a step of, when said condition is established, outputting a command value corresponding to the hydraulic pressure to be supplied to said first frictional engagement element such that the command value increases at a first rate of change which is determined in advance with a predetermined value being defined as an initial value;

an output step of, when the degree of pressing down the accelerator increases while the command value is outputted such that the command value increases at said first rate of change, outputting a command value such that the command value increases at a second rate of change which is determined in advance and is different from said first rate of change until an absolute value of a difference between the turbine rotation speed and a synchronized turbine rotation speed corresponding to the shift stage after said down shift decreases to a predetermined value or less, and said second rate of change is higher than said first rate of change.

7. The control method for the vehicle according to claim 6, said output step includes a step of, when said detected degree of pressing down the accelerator becomes a predetermined degree or more while the command value is outputted such that the command value increases at said first rate of change, outputting the command value such that the command value increases at said second rate of change.

8. The control method for the vehicle according to any one of claims 6 and 7, wherein said determination step includes:

a state determination step of determining whether or not said vehicle is in a driven state; and a shift stage determination step of determining whether or not the shift stage after the down shift is formed until a predetermined time elapses from a time point at which it is determined that said vehicle is in the driven state.

9. The control method for the vehicle according to claim 8, wherein said state determination step includes a step of determining whether or not said vehicle is in the driven state, based on at least any one of a vehicle speed and the degree of pressing down the accelerator.

10. The control method for the vehicle according to claim 8, wherein said automatic transmission includes a fluid coupling coupled to an output shaft of an internal combustion engine, and a transmission mechanism coupled to said fluid coupling, said control method further comprising a step of detecting a rotation speed of an input shaft of said transmission mechanism, wherein said shift stage determination step includes a step of determining that the shift stage after said down shift is not formed unless an absolute value of a difference between said detected input shaft rotation speed and a rotation speed corresponding to the shift stage after said down shift decreases to a predetermined value or less.

* * * * *